Figure 1:
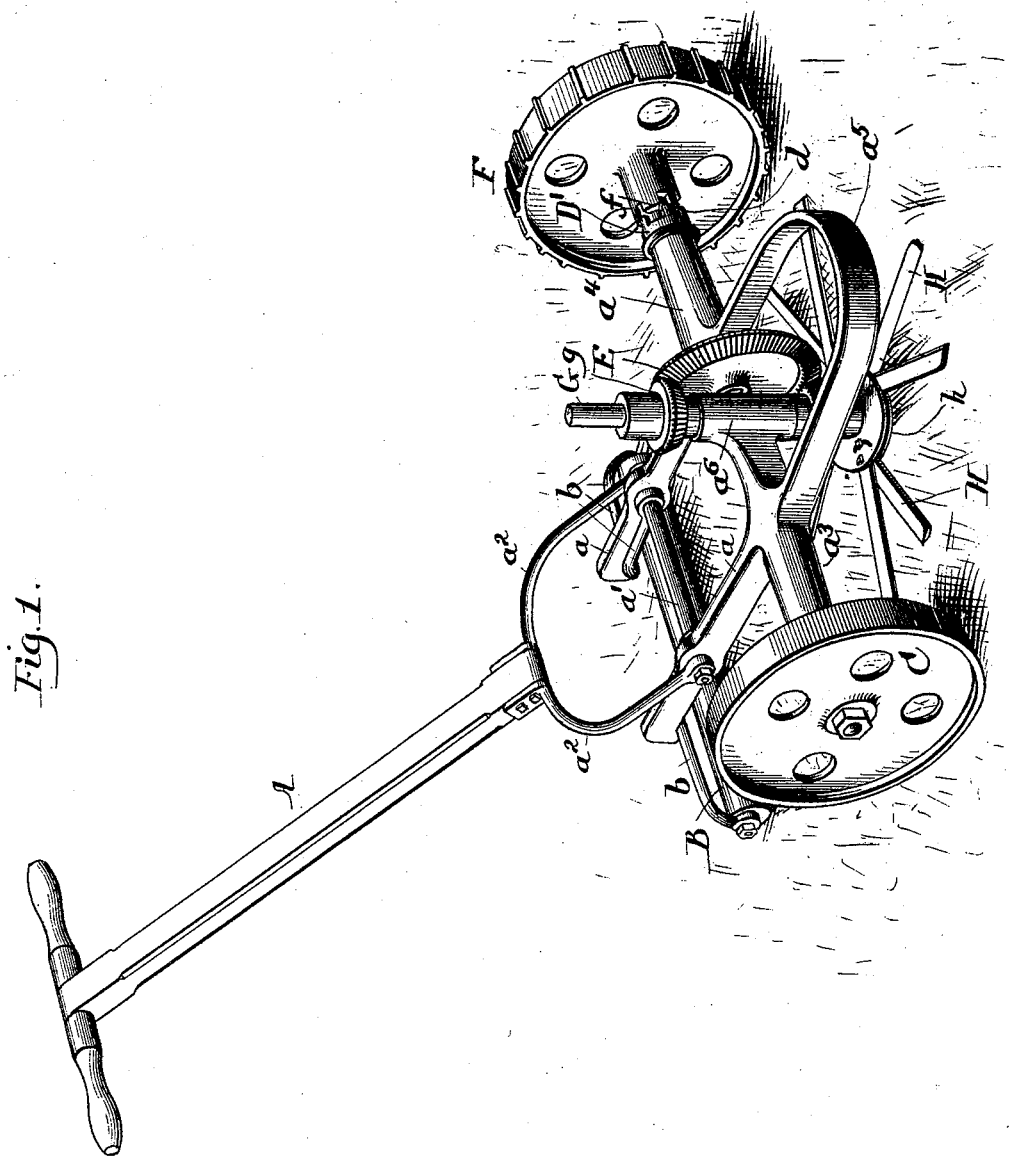

(No Model.) 2 Sheets—Sheet 1.
L. CLOUSING.
LAWN MOWER.

No. 498,533. Patented May 30, 1893.

Witnesses:
Fred Gerlach
Ida B. Carpenter

Inventor:
Louis Clousing
By Perry & Fisher
Attorneys.

THE NORRIS PETERS CO., PHOTO-LITHO., WASHINGTON, D. C.

(No Model.) 2 Sheets—Sheet 2.
L. CLOUSING.
LAWN MOWER.
No. 498,533. Patented May 30, 1893.
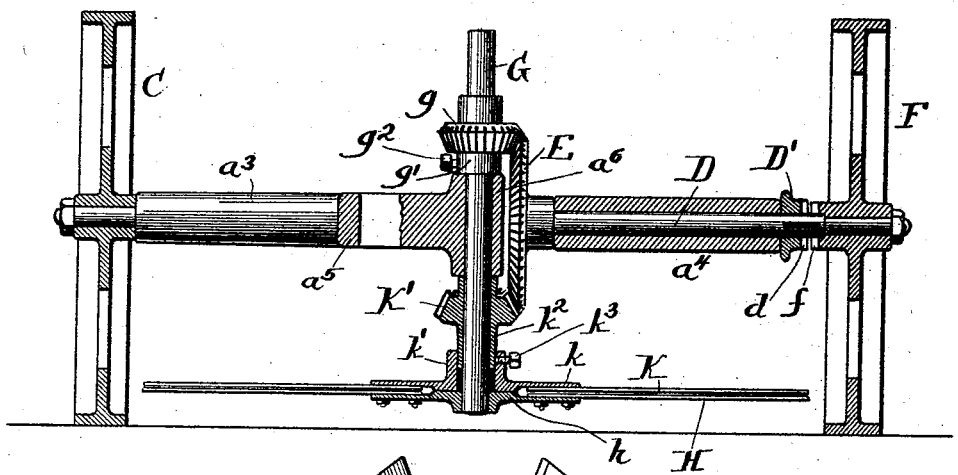
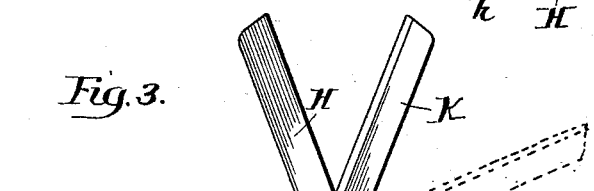
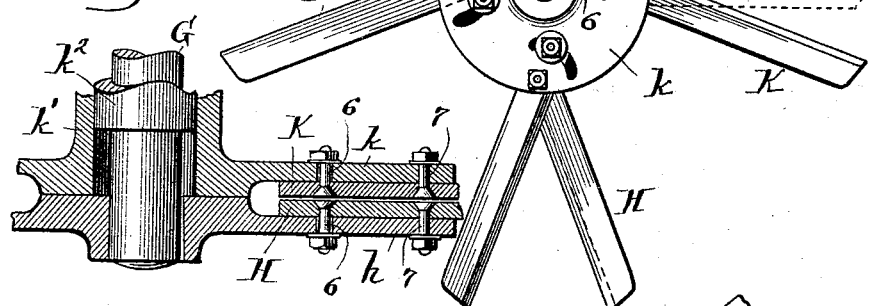
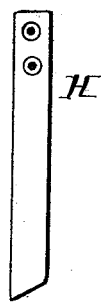
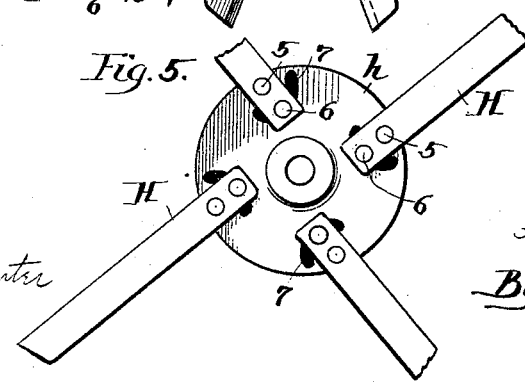
Witnesses:
Fred Gerlach
Ida S. Carpenter
Inventor:
Louis Clousing
By Fisher
Attorneys.

UNITED STATES PATENT OFFICE.

LOUIS CLOUSING, OF CHICAGO, ILLINOIS.

LAWN-MOWER.

SPECIFICATION forming part of Letters Patent No. 498,533, dated May 30, 1893.

Application filed April 4, 1892. Serial No. 427,612. (No model.)

*To all whom it may concern:*

Be it known that I, LOUIS CLOUSING, of Chicago, in the county of Cook and State of Illinois, have invented certain new and useful Improvements in Lawn-Mowers, of which I do declare the following to be a full, clear, and exact description, reference being had to the accompanying drawings, forming part of this specification.

My present invention has relation more particularly to that class of small mowing machines known as lawn-mowers, and especially does it relate to that type of lawn-mowers wherein the cutting of the grass is effected by means of horizontally rotating knives or blades.

The objects of the invention are to simplify and improve the mechanism for driving the knives; to provide improved means whereby the vertical adjustment of the knives can be effected in order to vary the extent of cut; to provide means whereby the knives can be adjusted so as to give a greater or less extent of shear action thereto, and to improve the construction of frame for sustaining the mechanism.

To this end my invention consists in the various novel features of construction hereinafter described, illustrated in the accompanying drawings and particularly defined in the claims at the end of this specification.

Figure 1 is a perspective view of a lawn-mower embodying my invention. Fig. 2 is a view in central vertical cross section parts being shown in elevation. Fig. 3 is a plan view of the revoluble cutter knives. Fig. 4 is an enlarged detail view in vertical section through the plates to which the cutter knives are attached. Fig. 5 is a detail plan view of one set of cutter knives, and the plate to which the knives are attached. Fig. 6 is a detail view of one of the cutter knives.

The frame of my improved machine is preferably of cast metal having rearwardly extended arms $a$ through which passes a rod $a'$ to which is swiveled the metal extension $a^2$ of the propelling handle A. To this rod $a'$ are also swiveled the arms $b$ of the trail wheel or roller B whereby the rear portion of the frame is sustained. The arms $b$ of the trail wheel or roller B are bent outwardly as shown so that when the roller is turned to position for use the bent portions of these arms $b$ will engage with the rear portions $a$ of the main frame. From one side of the main frame projects a stud $a^3$ preferably cast integral therewith, and upon the reduced end of this stud is journaled the sustaining wheel C. From the opposite side of the main frame projects a journal stud $a^4$ through which passes the shaft D, to the inner end of which is fixed a miter gear wheel E; and upon the opposite end of this shaft D is journaled the drive wheel F whereby motion is imparted to the knives. In order to permit the drive wheel F to be thrown into and out of gear with the shaft D, I prefer to provide the shaft D with a clutch D' keyed thereto in a manner permitting it to be moved lengthwise upon the shaft, and the inner end of the hub of the drive wheel F is furnished with teeth $f$ adapted to engage with corresponding teeth $d$ formed upon the inner end of the clutch D. Hence it will be seen that when the clutch D has its teeth $d$ in engagement with the teeth $f$ of the drive wheel F, motion will be imparted from the drive wheel to the shaft D and the miter gear wheel E, at the inner end of this shaft. A yoke $a^5$ preferably connects the studs $a^3$ and $a^4$ of the main frame, and at the center of the main fame is formed a vertical bearing stud $a^6$ within which is journaled the cutter spindle G. This cutter spindle G has fixed to its lower end one set of knives H, these knives being preferably attached to the spindle G, through the medium of a plate or disk $h$ that is fixed to the spindle G. Motion is imparted to the spindle G from the miter gear wheel E by means of a miter pinion $g$ fixed to the shaft G by its collar $g'$ and a set screw $g^2$, the collar $g'$ seating upon the upper end of the stud $a^6$. The upper set of knives K is attached to a plate $k$, the hub $k'$ of which fits over and is adjustably connected to the lower end of a sleeve $k^2$ depending from the miter pinion K' that also engages with the miter gear wheel E. Preferably the sleeve $k'$ is adjustably connected to the lower end of the sleeve $k^2$ by a set-screw $k^3$, the purpose of which adjustment will presently more fully appear. Through each of the knives H and K adjacent its ends, passes a bolt 5 this bolt passing also through the plate $h$ or plate $k$, and serving as a pivot point about which the knife may be adjusted, and through the end of each of the knives H and K passes an adjusting bolt 6 that passes through a slot 7 formed in the plate $h$ or $k$. It will be seen that by this construction, the angle of each of the knives H and K can be varied with respect to the radial line of the circle which it describes, by merely loosening the nut of the bolt 6 and fixing it at different points in the slot 7. By preference both the upper and lower sets of knives are adjusted in this manner the purpose of this adjustment mainly being to enable the knives to be set so that a greater or less degree of shear action may be imparted thereto, in order to facilitate the cutting of the grass.

A further advantage incident to the particular mechanism shown for effecting the adjustment of the knives is that in case the knives should strike an obstruction, the adjusting bolt will yield before the knives will break, allowing the knives to be thrown to the position indicated in dotted lines in Fig. 2. It will be observed that the knives H and K can be readily detached to permit them to be sharpened and their construction is such that they can be conveniently sharpened upon an ordinary grindstone or like device by even an unskilled person. In order to effect the vertical adjustment of the knives H and K to vary the height at which these knives shall cut the grass, it is only necessary to loosen the set-screw $k^3$ so as to permit the sleeve $k'$ to be drawn upward, then loosening the set screw $g^2$ and raising the vertical spindle G, this raising of the vertical spindle serving to lift both sets of knives as the plate $k$ carrying the upper set of knives rests upon the plate $h$ by which the lower knives are carried. After the knives are adjusted to the proper height the set screws $k^3$ and $g^2$ will be again tightened so as to secure the proper movement of the knives.

It is manifest that the precise details of construction above set out may be varied by the skilled mechanic without departing from the spirit of my invention. And it is manifest also that features of my invention may be employed without its adoption as an entirety. Thus, for example, the mechanism for sustaining and driving the knives may be employed in connection with knives of any other suitable construction such as cutter disks, or plates having knives at their peripheries, as has been heretofore proposed. So, also, the broad feature of effecting the vertical adjustment of the knives will be found of advantage whether one or both sets of knives have revolution imparted thereto.

Having thus described my invention, what I claim as new, and desire to secure by Letters Patent, is—

1. In a mowing-machine, a sustaining frame comprising side arms $a$ suitably connected together, journal studs $a^3$ and $a^4$ projecting from said side arms, one of said studs being hollow, and a central vertically perforated bearing stud $a^6$ in line with said studs $a^3$ and $a^4$, in combination with the rotating knives, a vertical spindle passing through said central bearing stud for rotating said knives, and a drive spindle passing through one of said laterally projecting studs and suitably geared to said vertical spindle, and a main drive wheel and a sustaining wheel, substantially as described.

2. In a mowing-machine, the combination with a sustaining frame, of two sets of revoluble knives H and K, a vertical spindle G to which one set of knives is connected, a gear pinion $g$ connected to said vertical spindle, a drive gear wheel E meshing with said pinion $g$, a gear pinion K' loosely mounted upon said vertical spindle G, and having one set of knives connected thereto, said gear pinion K' also meshing with said gear wheel E, a drive spindle and a drive wheel for imparting movement to said gear wheel E, substantially as described.

3. In a mowing machine, the combination with a main sustaining frame, of two sets of revoluble knives, a vertically adjustable spindle to which one set of knives is connected a gear pinion adjustably mounted upon said vertical spindle, a second gear pinion loosely mounted upon said vertical spindle and adjustably connected to one set of knives, a drive gear wheel meshing with both of said pinions, and a suitable drive spindle and drive wheel for imparting movement to said drive gear wheel, substantially as described.

4. In a mowing machine the combination with a main sustaining frame, of two sets of horizontally revoluble knives, a vertical spindle G to which one set of knives is attached, a gear pinion K' loosely mounted upon said spindle and provided with a sleeve to which the other set of said knives is adjustably connected, a gear pinion $g$ adjustably held upon said spindle G, a main drive wheel E meshing with said pinions $g$ and K', a drive spindle D and a drive wheel F suitably connected to said drive spindle, substantially as described.

5. In a mowing machine, the combination with a suitable sustaining frame, of two sets of revoluble knives and suitable mechanism for imparting revolution to said knives, in opposite directions, one set at least of said knives being adjustable laterally with respect to a radial line in order to impart a greater or less shear action to said knives, substantially as described.

6. In a mowing machine, the combination with the cutting knives and mechanism for driving the same, and the sustaining frame having rearwardly extending arms $a$, of a drive wheel or roller E having arms $e$ pivoted to said arms $a$ at a distance from their free ends, said arms $e$ extending transversely of and engaging the free ends of the arms $a$, substantially as described.

LOUIS CLOUSING.

Witnesses:
GEO. P. FISHER, Jr.,
I. B. CARPENTER.